(12) United States Patent
Jalpa et al.

(10) Patent No.: US 10,099,538 B2
(45) Date of Patent: Oct. 16, 2018

(54) TWO-LAYER POLARIZED VISOR

(71) Applicant: FORD GLOBAL TECHNOLOGIES, LLC, Dearborn, MI (US)

(72) Inventors: Jonathan Kaleb Jalpa, Azcapotzalco (MX); Mark Vargas Morelli Luna, Delegacion Xochimilco (MX); Gerardo Brigido Delgado, Livonia, MI (US); Edgar Emanuel Romero, Atzapan de Zaragoza (MX)

(73) Assignee: Ford Global Technologies LLC, Dearborn, MI (US)

( * ) Notice: Subject to any disclaimer, the term of this patent is extended or adjusted under 35 U.S.C. 154(b) by 27 days.

(21) Appl. No.: 15/205,836

(22) Filed: Jul. 8, 2016

(65) Prior Publication Data
US 2018/0009295 A1  Jan. 11, 2018

(51) Int. Cl.
*B60J 3/06* (2006.01)
*B60J 3/00* (2006.01)
*B60J 3/02* (2006.01)

(52) U.S. Cl.
CPC .......... *B60J 3/06* (2013.01); *B60J 3/007* (2013.01); *B60J 3/026* (2013.01); *B60J 3/0208* (2013.01)

(58) Field of Classification Search
CPC ... B60J 3/06; B60J 3/0208; B60J 3/007; B60J 3/026
See application file for complete search history.

(56) References Cited

U.S. PATENT DOCUMENTS

| | | | |
|---|---|---|---|
| 2,856,810 A | 10/1958 | Frost et al. | |
| 4,090,732 A | 5/1978 | Vistitsky | |
| 4,858,989 A | 8/1989 | Bruckstein | |
| 5,115,341 A | 5/1992 | Bentley | |
| 8,038,199 B2 | 10/2011 | Marcus et al. | |
| 8,083,385 B1 | 12/2011 | Yang | |
| 2006/0193046 A1 | 8/2006 | Yellin | |
| 2011/0057471 A1* | 3/2011 | Lane | B60J 3/0204 296/97.6 |
| 2011/0233958 A1* | 9/2011 | Rhine | B60J 3/0208 296/97.1 |

FOREIGN PATENT DOCUMENTS

| | | | | |
|---|---|---|---|---|
| EP | 0983889 A2 * | 3/2000 | ........... | B60J 3/0282 |
| EP | 1780062 A1 | 5/2007 | | |

(Continued)

OTHER PUBLICATIONS

N. J. Lowe, An Overview of Ultraviolet Radiation, Sunscreens, and Photo-Induced Dermatoses: Dermatologic Clinics; Elsevier Inc; vol. 24 Issue 1; 2005; p. 9 of 9.

(Continued)

*Primary Examiner* — D Glenn Dayoan
*Assistant Examiner* — Melissa A Black
(74) *Attorney, Agent, or Firm* — Vichit Chea; King & Schickli PLLC

(57) ABSTRACT

A visor assembly for a vehicle includes a visor body comprising adjacent hingedly connected panels each fabricated of a polarizing material. A closure is provided to hold the adjacent panels in a closed configuration. The assembly may further include an articulating mirror assembly whose movement is independent of any movement of the visor assembly.

11 Claims, 3 Drawing Sheets

(56) References Cited

FOREIGN PATENT DOCUMENTS

| JP | 10272924 A | * | 10/1998 |
| WO | WO2005084977 A1 | | 9/2005 |
| WO | WO2006031835 A2 | | 3/2006 |

OTHER PUBLICATIONS

Van B. Nakagawara; Natural Sunlight and Its Association to Civil Aviation Accidents; Optometry Journal of the American Optometric Association; Elsevier Inc; vol. 75 Issue 8; Aug. 2004; pp. 1-5.

N. J. Lowe, An Overview of Ultraviolet Radiation, Sunscreens, and Photo-Induced Dermatoses; Dermatologic Clinics; Elsevier Inc; vol. 24 Issue 1; 2006; p. 1 of 1.

* cited by examiner

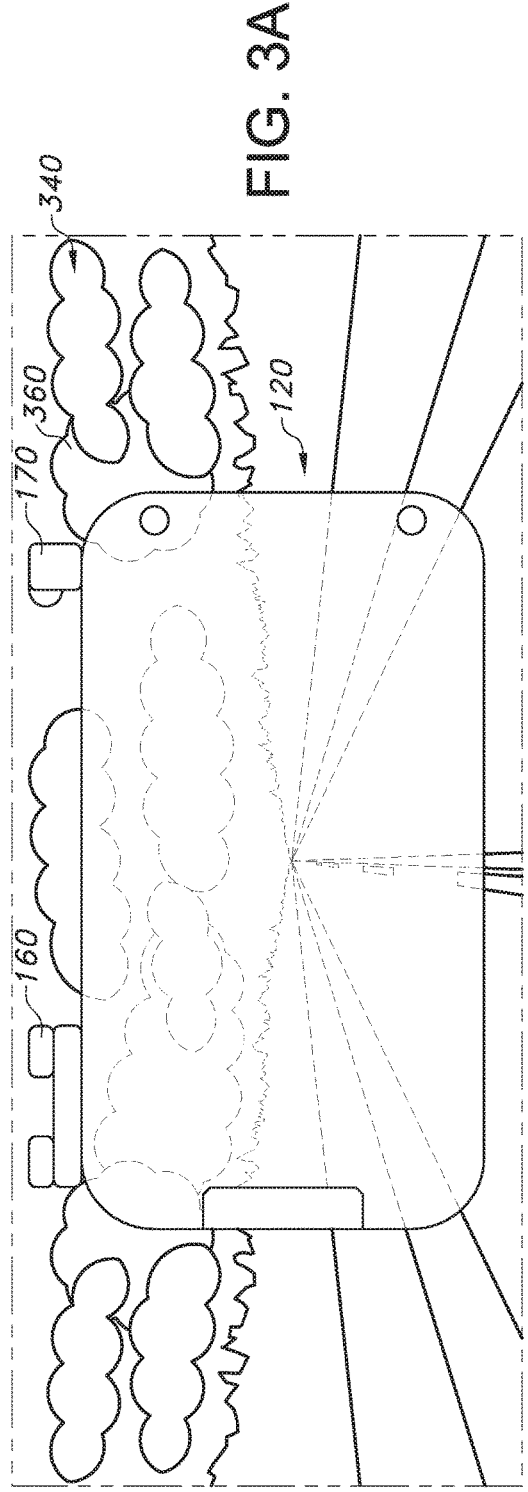
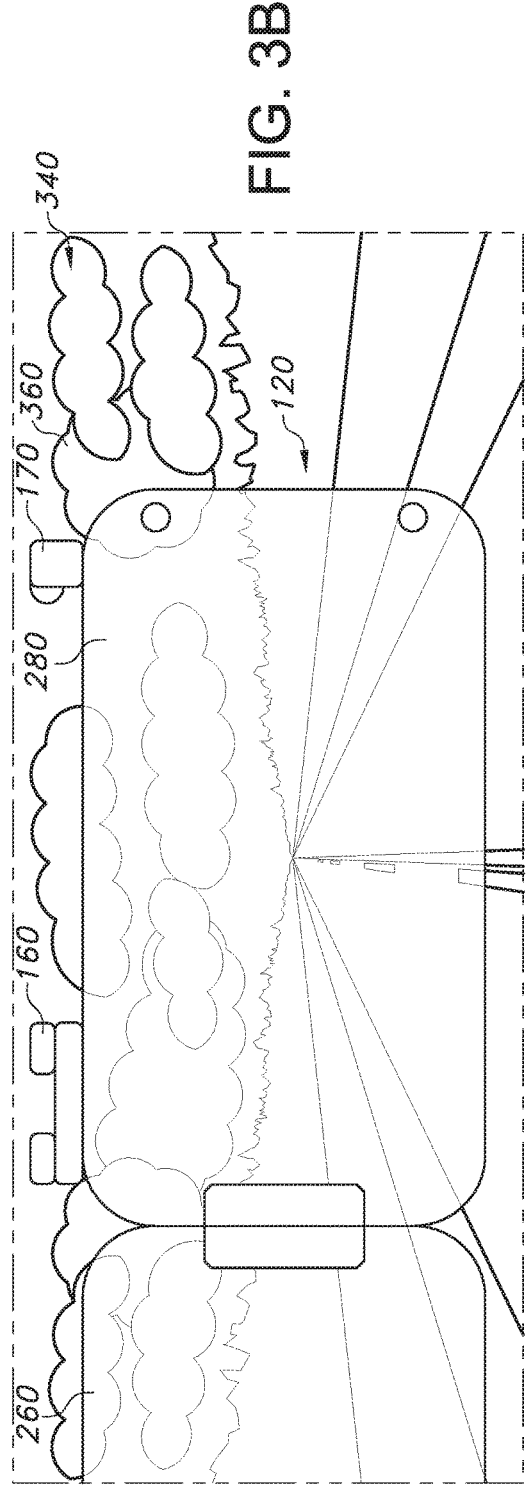

TWO-LAYER POLARIZED VISOR

TECHNICAL FIELD

This disclosure relates generally to visors for motor vehicles. More particularly, the disclosure relates to an improved visor assembly defined by adjacent hinged panels each fabricated of a polarized material.

BACKGROUND

It is known to provide visors for vehicles which can be pivoted into a desired orientation prevent or reduce glare to the vehicle driver and/or passenger's eyes. Such glare may come from the sun, the headlights of oncoming traffic, and other sources. Prior art visor designs often are simply a visor panel or blade which the user can pivot by way of a pivoting arm to translate the panel from a first position to a second position depending on whether the majority of the glare is angled through the vehicle windshield or the driver or passenger window. The visor body, which is typically defined by a single panel, can also pivot on an arm between a raised and a lowered orientation.

Such conventional visors are suitable for their intended purpose, but disadvantageously block a portion of a driver or passenger's view of the road through a vehicle windshield when pivoted to the lowered, glare-blocking orientation. Accordingly, a need is identified in the art for improvements to visor designs. In particular, it would be desirable to provide a visor which, when positioned to block glare, did not significantly interfere with a driver or passenger's view of the road and/or oncoming obstacles, pedestrians, and traffic.

SUMMARY

In accordance with the purposes and benefits described herein and to solve the above-summarized and other problems, in one aspect a visor assembly for a vehicle is described, comprising a pivoting visor body comprising adjacent panels hingedly connected at an edge thereof for translation between an open configuration and a closed configuration. The visor assembly may optionally include an articulating mirror assembly serving as a vanity mirror. The adjacent panels are held in the closed configuration by at least one closure, which in embodiments may be a magnetic closure such as a magnetic bumpstop, a catch, a latch, and others.

Each of the adjacent panels is fabricated of a polarizing material, which may be selected in embodiments from the group consisting of a tint, a photochromic material, a mirrored surface or coating, a scratch resistant surface or coating, an anti-reflective surface or coating, an ultraviolet ray blocking surface or coating, and others. Such materials may comprise or be incorporated into/coated onto any suitable substrate, including without intending any limitation glass, plastic, polymers, and polycarbonate.

In embodiments, the visor body is pivotally connected to a pivoting visor arm and the articulating mirror assembly comprises a reflective surface that is pivotally connected to a pivoting mirror arm. As such, the articulating mirror assembly is configured for translation between a stowed position and a deployed position independently of any movement of the visor body.

In the following description, there are shown and described embodiments of the disclosed visor assembly. As it should be realized, the device is capable of other, different embodiments and its several details are capable of modification in various, obvious aspects all without departing from the devices and methods as set forth and described in the following claims. Accordingly, the drawings and descriptions should be regarded as illustrative in nature and not as restrictive.

BRIEF DESCRIPTION OF THE DRAWINGS

The accompanying drawing figures incorporated herein and forming a part of the specification, illustrate several aspects of the disclosed visor assembly, and together with the description serve to explain certain principles thereof. In the drawing:

FIG. 3A shows the visor assembly according to the present disclosure in use in a vehicle in the closed configuration of FIG. 1; and FIG. 3B shows the visor assembly according to the present disclosure in use in a vehicle in the open configuration of FIG. 2.

Reference will now be made in detail to embodiments of the disclosed visor assembly, examples of which are illustrated in the accompanying drawing figures wherein like reference numerals indicate like features.

DETAILED DESCRIPTION

Figure 1:
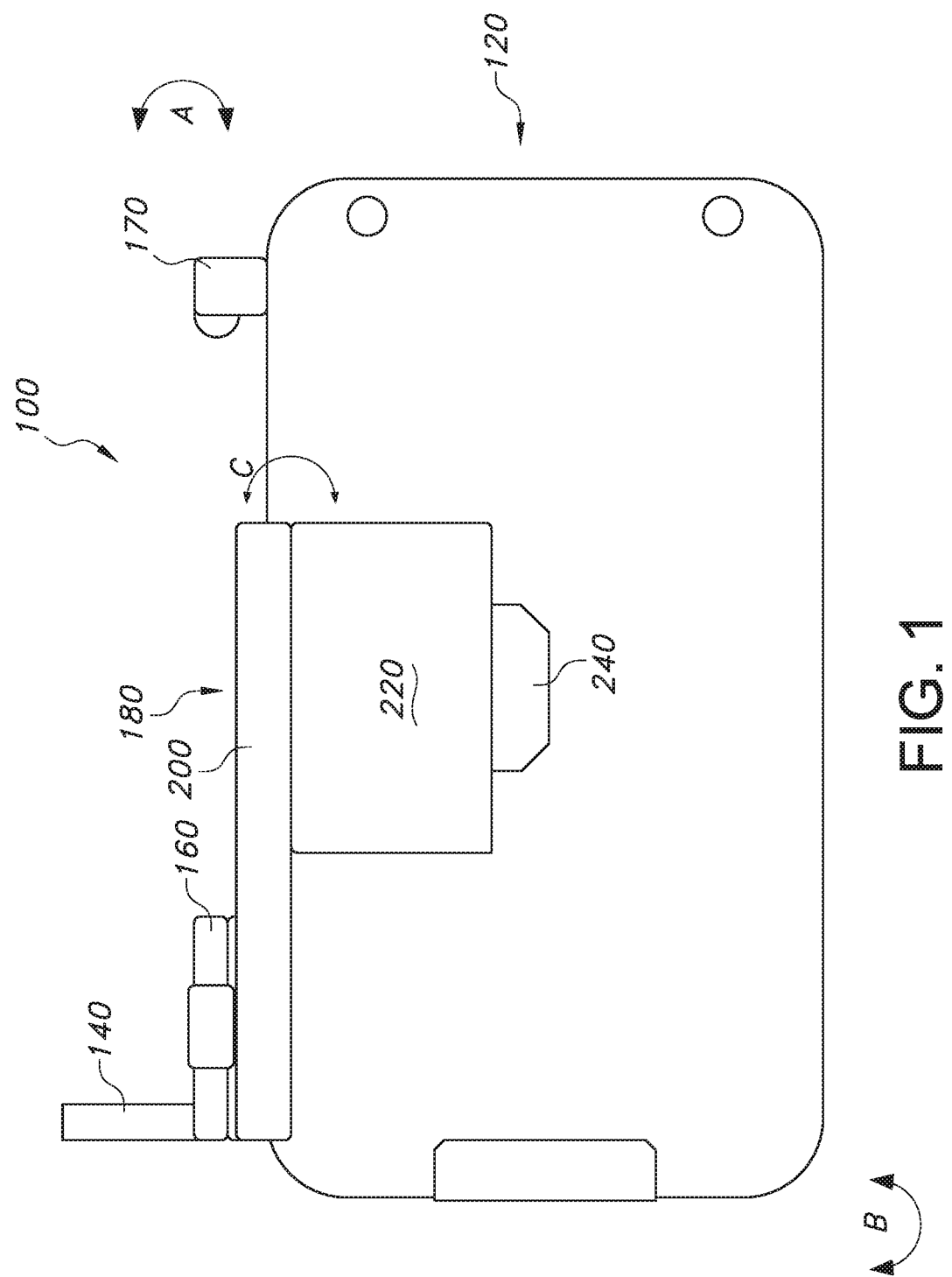
FIG. 1 shows a visor assembly according to the present disclosure, held in a closed configuration.

With reference to FIG. 1, a visor assembly 100 is provided including a visor body 120, a pivoting visor arm 140, and a visor arm mounting bracket 160. Bracket 160 is configured to allow pivoting of arm 140 (see arrow A) to translate the visor body 120 between a stowed position substantially flush against a vehicle roof or headliner (not shown), a forward-facing deployed orientation as shown in FIG. 1 to reduce glare passing through a vehicle windshield (not shown) and a side-facing orientation to reduce glare passing through a vehicle side window (see arrows A, B). A catch 170 is provided to capture a cooperating receiver (not shown) disposed on a vehicle roof panel or headliner.

The visor assembly 100 further includes an articulating mirror assembly 180 comprising a pivoting mirror arm 200 and a reflective surface 220 serving as a vanity mirror. The reflective surface 220 may further include a tab 240 allowing the user to pivot the reflective surface at least upwardly and downwardly between a stowed and a deployed configuration for use (see arrow C). In the depicted embodiment, the pivoting mirror arm 200 is pivotally secured to the pivoting visor arm 140 at the visor arm mounting bracket 160. As will be appreciated, this allows a pivoting motion of the mirror assembly 180 that is effected independently of any movement of the visor assembly 100.

Figure 2:
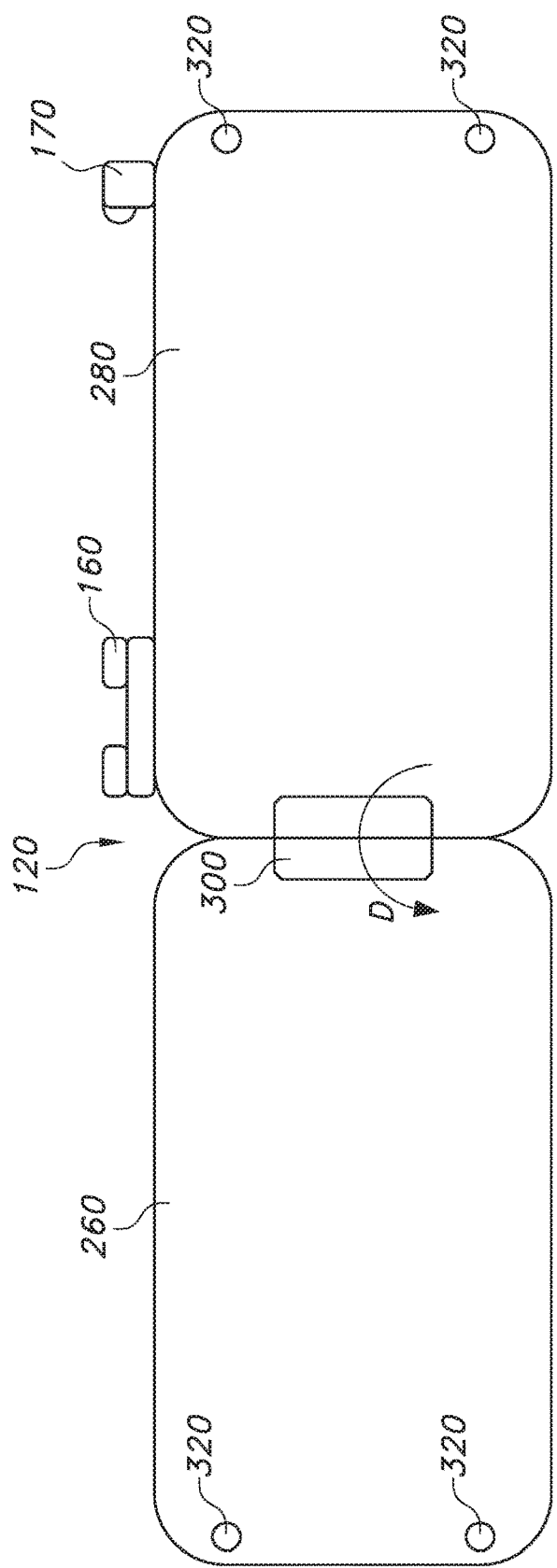
FIG. 2 shows the visor assembly of FIG. 1, held in an open configuration.

With reference to FIG. 2, the visor body 120 is defined by a pair of panels 260, 280 hingedly attached at an edge thereof by at least one hinge 300. By hinge 300, the panels 260, 280 are configured to be translated between the closed configuration of FIG. 1 and the open configuration of FIG. 2. A closure is provided to hold the panels 260, 280 in the closed configuration, in the depicted embodiment being a plurality of cooperating magnetic bumpstops 320. Of course, any suitable friction fit closure, latch, lock, clasp, etc. is contemplated for use in serving as the described closure.

The panels 260, 280 are fabricated of a suitable polarizing material. As is known in the art, polarizing materials or polarizers are a type of optical filter allowing light of a specific polarization to pass while blocking light of other polarizations. Commonly known polarizing materials include linear polarizers and circular polarizers. Linear polarizers may include wire-grid polarizers, absorptive polarizers, beam-splitting polarizers, reflective polarizers, birefringent polarizers, thin-film polarizers, and others. Use of any such suitable polarizing material is contemplated, including without intending any limitation polarizing materials selected from one or more of a tint, a photochromic material, a mirrored surface or coating, a scratch resistant surface or coating, an anti-reflective surface or coating, an ultraviolet ray blocking surface or coating, and others. Further, combinations of such polarizing materials are contemplated. Such materials may comprise or be incorporated into/coated onto any suitable substrate, including without intending any limitation glass, plastic, polymers, and polycarbonate.

FIGS. 3A and 3B show the visor body 120 in use in a vehicle 340, deployed by pivoting downwardly to overlay a portion of the vehicle windshield 360. In the closed configuration shown in FIG. 3A, both polarizing panels 260, 280 are disposed in a substantially coplanar arrangement, increasing the polarizing function of the visor body 120 to stop glare. On the other hand, in the open configuration shown in FIG. 3B, one panel 280 is so positioned before the windshield 360 whereas the other panel 260 is positioned before a vehicle side window (not shown) to block glare approaching a vehicle occupant from the side. As will be appreciated, in this open configuration each polarizing panel 260, 280 provides a lesser polarizing function than the visor body 120 in the closed configuration, but still blocks glare approaching a vehicle occupant both from the front and from the side.

In both described configurations, however, the visor body 120 does not block the vehicle occupant's view of the road. Rather, being transparent but polarizing the visor body 120 allows the occupant to see therethrough while still blocking glare. As will also be appreciated, the visor body 120 comprising polarizing panels 260, 280 allow the vehicle occupant to choose the level of transparency of the visor assembly 100. So, in high glare conditions (harsh daylight, oncoming traffic with high beams on, etc.) a user may choose to use the visor body 120 in the closed configuration of FIGS. 1 and 3A to reduce transparency of the visor and block more glare. On the other hand, in low light conditions (dusk, overcast, cloudy, etc.) when there is less glare to block, a user may choose to use the visor body 120 in the open configuration of FIGS. 2 and 3B to increase transparency of the visor and improve occupant visibility.

As will be appreciated, by the foregoing description is provided a convenient, useful visor assembly which allows blocking glare from various sources, while still allowing a vehicle occupant an unblocked view of the road. In turn, the separately articulable mirror assembly can be used without regard to any deployment of the visor assembly.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A visor assembly for a vehicle, comprising a visor body carried by a pivoting visor arm and comprising adjacent panels hingedly connected at an outboard end thereof for translation between an open configuration and a closed configuration, wherein each adjacent panel is fabricated of a polarizing material;
   further including an articulating mirror assembly connected to a pivoting mirror arm independently carried by the pivoting visor arm for translation between a stowed position and a deployed position independently of the visor body.

2. The visor assembly of claim 1, wherein the adjacent panels are held in the closed configuration by at least one closure.

3. The visor assembly of claim 2, wherein the at least one closure is a magnetic bumpstop.

4. The visor assembly of claim 1, wherein the adjacent panels are fabricated of or include a polarizing material selected from the group consisting of a tint, a photochromic material, a mirrored surface or coating, a scratch resistant surface or coating, an anti-reflective surface or coating, an ultraviolet ray blocking surface or coating, and combinations.

5. The visor assembly of claim 1, further wherein the visor body is pivotally connected to the pivoting visor arm.

6. The visor assembly of claim 1, wherein the articulating mirror assembly comprises a reflective surface that is pivotally connected to the pivoting mirror arm.

7. A vehicle including the visor assembly of claim 1.

8. A visor assembly for a vehicle, comprising:
   a pivoting visor body carried by a pivoting visor arm and comprising adjacent panels each fabricated of a polarizing material and hingedly connected at an outboard end thereof for translation between an open configuration and a closed configuration, further including a magnetic closure for holding the visor body in the closed configuration; and
   an articulating mirror assembly connected to a pivoting mirror arm independently carried by the pivoting visor arm for translation between a stowed position and a deployed position independently of the visor body.

9. The visor assembly of claim 8, wherein the adjacent panels are fabricated of a polarizing material selected from the group consisting of a tint, a photochromic material, a mirrored surface or coating, a scratch resistant surface or coating, an anti-reflective surface or coating, an ultraviolet ray blocking surface or coating, and combinations.

10. The visor assembly of claim 8, wherein the articulating mirror assembly comprises a reflective surface that is pivotally connected to the pivoting mirror arm.

11. A vehicle including the visor assembly of claim 8.

* * * * *